Figure 3:
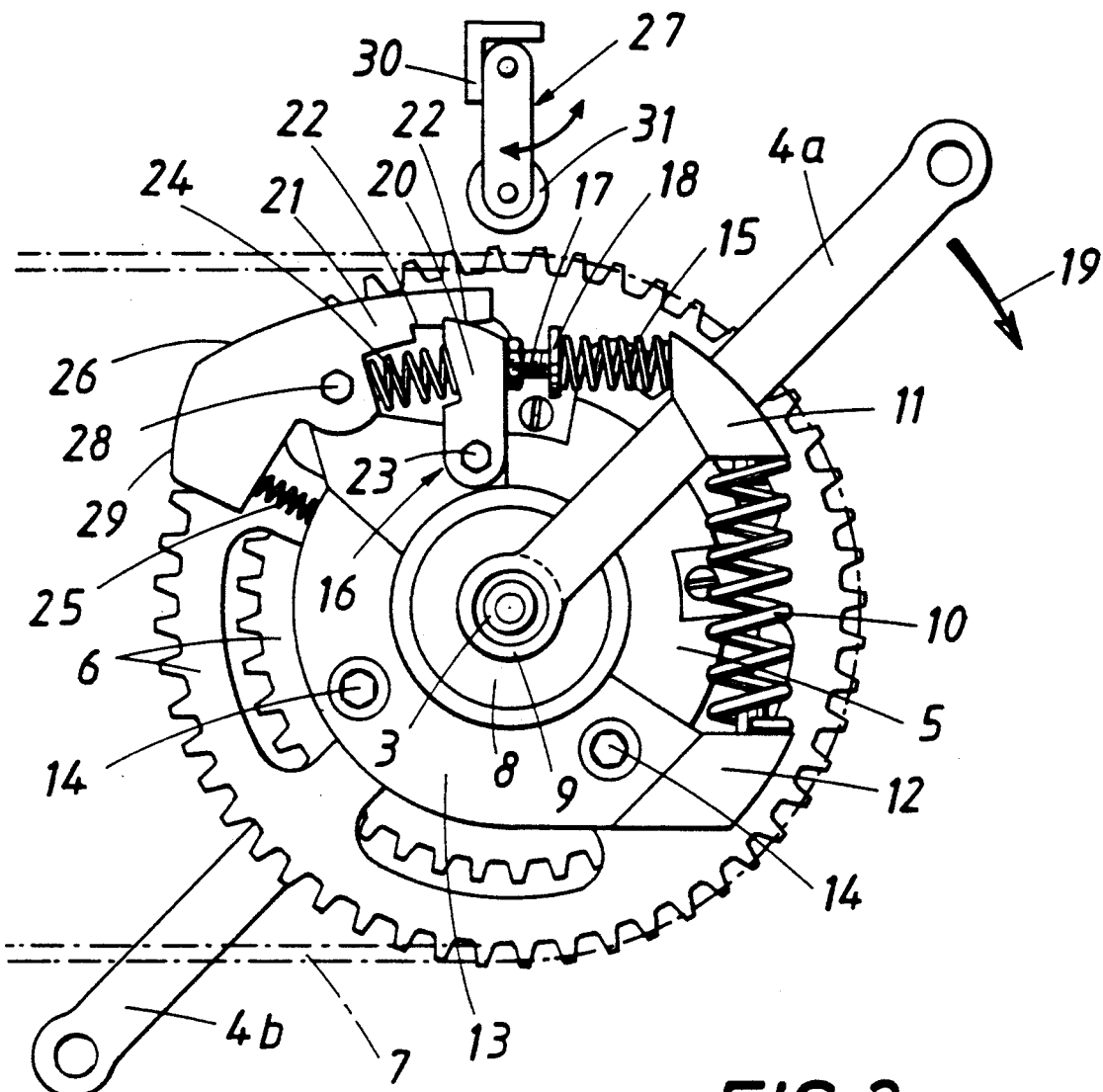

United States Patent [19]

Hilber

[11] Patent Number: 5,279,524
[45] Date of Patent: Jan. 18, 1994

[54] PEDAL CRANK DRIVE FOR A BICYCLE

[76] Inventor: Gerhard Hilber, A-5081 Anif 289, Austria

[21] Appl. No.: 30,051
[22] PCT Filed: Sep. 2, 1991
[86] PCT No.: PCT/AT91/00098
§ 371 Date: Mar. 4, 1993
§ 102(e) Date: Mar. 4, 1993
[87] PCT Pub. No.: WO92/04230
PCT Pub. Date: Mar. 19, 1992

[30] Foreign Application Priority Data

Sep. 4, 1990 [AT] Austria ............... 1802/90

[51] Int. Cl.⁵ ............................. F16H 63/00
[52] U.S. Cl. .................................... 474/69
[58] Field of Search ............ 474/69, 70, 152, 156; 74/594.1, 594.2

[56] References Cited

U.S. PATENT DOCUMENTS

| 3,828,621 | 8/1974 | Uchino . |
| 5,035,678 | 7/1991 | Hageman ............ 474/69 X |
| 5,067,370 | 11/1991 | Lemmens ............ 474/152 X |

FOREIGN PATENT DOCUMENTS

| 12170 | 5/1909 | France . |
| 539538 | 7/1973 | Switzerland . |
| 232424 | 6/1922 | United Kingdom . |

Primary Examiner—Thuy M. Bui
Attorney, Agent, or Firm—Kurt Kelman

[57] ABSTRACT

In a pedal crank drive for a bicycle, comprising two pedal cranks (4a, 4b) which are non-rotatably interconnected by a pedal crank shaft (3), a chain sprocket (5), which has at least one gear ring (6) and is mounted to be rotatable relative to the pedal crank shaft (3), and at least one force-transmitting spring (10), which is disposed between the chain sprocket (5) and that pedal crank (4a) which is adjacent to the chain sprocket (5), and said spring (10) is adapted to be biased by a forward rotation of the pedal cranks (4a, 4b), it is proposed to improve the distribution of the torque during a revolution of the chain sprocket in that a damping spring (15), which is prestressed in a sense to bias the force-transmitting spring (10), is provided between the chain sprocket (5) and the adjacent pedal crank (4a).

5 Claims, 2 Drawing Sheets

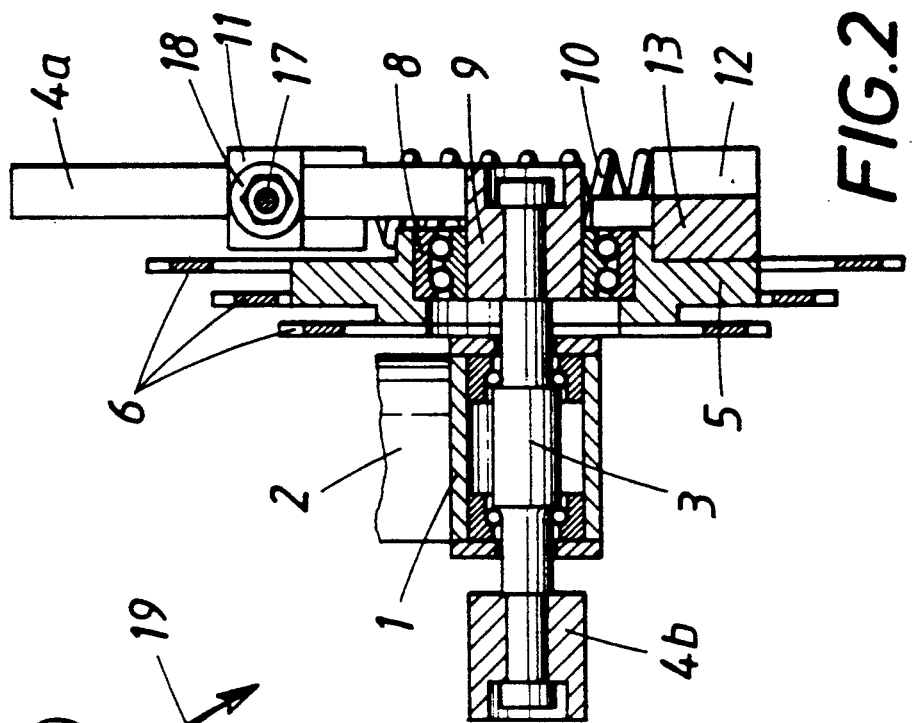
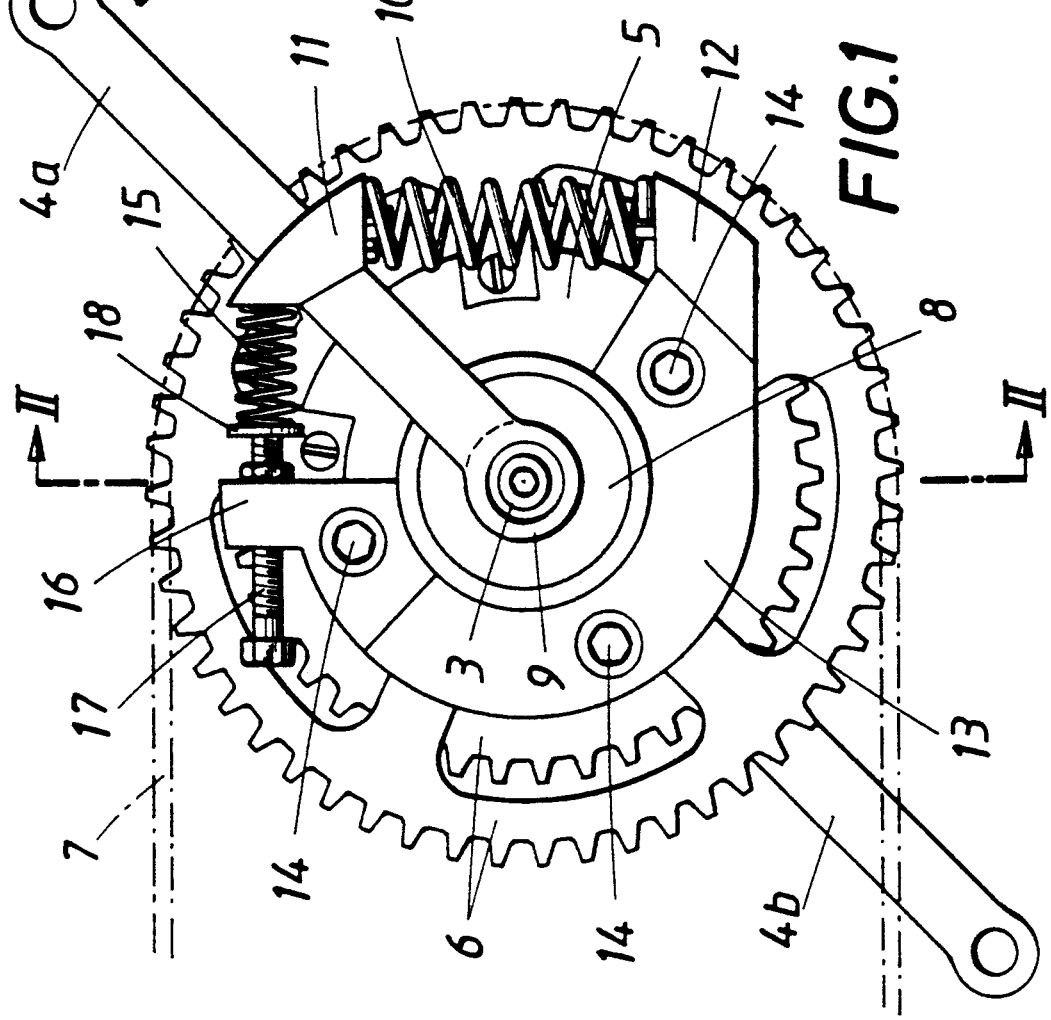

PEDAL CRANK DRIVE FOR A BICYCLE

This invention relates to a pedal crank drive for a bicycle, comprising two pedal cranks, which are non-rotatably interconnected by a pedal crank shaft, a chain sprocket, which has at least one gear ring and is mounted to be rotatable relative to the pedal crank shaft, and at least one force-transmitting spring, which is disposed between the chain sprocket and that pedal crank which is adjacent to the chain sprocket, and said spring is adapted to be biased by a forward rotation of the pedal cranks.

In known pedal crank drives of that kind (Swiss Patent Specification 539,538) the force-transmitting spring which is provided between the hub of the chain sprocket and the gear ring, which is rotatably mounted on the hub, consists of a tension spring and serves to overcome the top and bottom dead centers of the pedal crank drive because the force-transmitting spring is tensioned as the hub of the chain sprocket leads the gear as the pedal cranks are tread down and said spring can relax and transmit a corresponding torque to the gear ring at the dead center. Because considerable driving forces must be expected as the pedal crank drive is tread down, the desired effect cannot be ensured unless the force-transmitting spring is so dimensioned that it can store a sufficient part of the force within the limited spring excursion which is available. But it has been found that the desired effect will not reliably be achieved with increasingly harder force-transmitting springs because as the spring force increases the cyclist will be increasingly unable to exert at the dead center of the pedal crank drive a supporting torque which is sufficient to prevent a reverse rotation of the pedal crank so that the relaxation of the force-transmitting spring may result in a distinct deceleration and subsequently in a reverse rotation of the pedal cranks and this is regarded as most disturbing and will oppose a uniform rotation of the pedal crank drive.

For this reason it is an object of the invention so to improve by simple structural means a pedal crank drive of the kind described first hereinbefore that a desirable distribution of the torque through a revolution of the chain sprocket can be achieved whereas an effective assistance of the overcoming of the dead center by a force-transmitting spring disposed between the crank drive and the chain sprocket is still provided.

The object set forth is accomplished by the invention in that a damping spring, which is prestressed in a sense to stress the force-transmitting spring, is provided between the chain sprocket and the adjacent pedal crank.

Because the damping spring is prestressed in a sense to stress the force-transmitting spring, the force-transmitting spring can relax only against the force of the damping spring and the damping force of the damping spring increases as the force-transmitting spring is progressively relaxed. As a result, the load conditions of the pedal crank drive at the dead center are so changed that the torque which is exerted by the cyclist even at the dead center will certainly be sufficient to prevent an appreciable deceleration of the rotation of the pedal crank. As a result, the torque is more uniformly distributed over a revolution of the chain sprocket and this fact will produce desirable results, particularly when relatively heavy loads are exerted on the pedal cranks, as is usually the case during uphill runs.

For its damping function the damping spring must be comparatively soft compared to the force-transmitting spring. For this reason the force of the damping spring should not exceed one-half of the force of the force-transmitting spring. The adaptation of the instantaneous damping force to the load on the force-transmitting spring may be effected by an adjustment of the initial stress of the damping spring, although a change of the initial stress of the damping spring will obviously change also the initial stress of the force-transmitting spring. Because the damping force desirable increases with an increase of the load on the force-transmitting spring, particularly desirable driving conditions will be achieved if the initial stress of the damping spring can be adjusted in dependence on the spring excursion of the force-transmitting spring. In such case the stronger driving forces exerted during an uphill run will increase not only the spring excursion of the force-transmitting spring but also the initial stress of the damping spring so that the reversing torque which would otherwise be exerted on the pedal cranks as the force-transmitting spring relaxes can sufficiently be damped.

To permit an adjustment of the initial stress of the damping spring in dependence on the spring excursion of the force-transmitting spring, the damping spring may be supported by a ratchet lever, which is spring-loaded in the sense of the damping spring and which cooperates with a pawl, which defines at least one detent position for the ratchet lever. When the loads which are being exerted increase the spring excursion of the force-transmitting spring to such an extent that the ratchet lever can be readjusted to the next detent position, the initial stress will be increased in dependence to the travel of the pawl so that the damping force is adapted as desired to the increasing loads on the pedal crank drive.

If an elimination or appreciable decrease of the damping force within the range of adjustment of the ratchet lever between two detent positions is to be avoided, the spring for readjusting the ratchet lever must be dimensioned in accordance with the damping spring.

For a relaxation of the damping spring it is sufficient to release the pawl for the ratchet lever. This can be effected in various ways. The manipulation will be particularly simple if the pawl has a cam face, which is engageable by an unlocking member, past which the pawl is moved during a revolution of the chain sprocket. As the unlocking member runs up on the cam face of the pawl, the pawl is unlocked opposite to its spring bias so that the ratchet lever biased by the force-transmitting spring is restored to its initial position. To permit the ratchet lever to be unlocked in a simple manner during a run, the unlocking member can be pivotally moved by a Bowden cable or the like into the orbit of the pawl.

To permit the occurring driving and damping forces to be taken up within the limits imposed by the spring excursions, it is recommendable to provide a force-transmitting spring and a damping spring consisting of compression springs and to clamp between said springs the pedal crank that is adjacent to the chain sprocket. But sufficiently stiff means must be provided for supporting said springs relative to the chain sprocket. For that purpose the means for supporting the force-transmitting spring and the damping spring adjacent to those spring ends which are remote from the pedal crank may be constituted by the legs of a substantially U-shaped holder, which is adapted to be clamped to the chain sprocket on its outside and for this reason permits the use of a chain sprocket which has substantially the conventional design and which for multiple-speed transmissions may be provided with two or three gear rings. The holder itself can readily be sufficiently dimensioned for taking up the forces which occur without restraining the rotation of the chain sprocket relative to the pedal cranks because the pedal crank which is adjacent to the chain sprocket can be embraced by the U-shaped holder on both sides with a clearance which is sufficient for a rotation of the chain sprocket relative to the pedal crank.

The subject matter of the invention is shown by way of example in the drawing, in which FIG. 1 is a side elevation showing a pedal crank drive in accordance with the invention for a bicycle, FIG. 2 is a sectional view taken on line II—II in FIG. 1 and showing that pedal crank drive, and FIG. 3 is a view that is similar to FIG. 1 and shows a modified embodiment.

The pedal crank drive shown in FIGS. 1 and 2 essentially consists of a pedal crank shaft 3, which is rotatably held in a bearing 1 of the frame 2 of the bicycle and by which two pedal cranks 4a, 4b are non-rotatably connected, which are provided on both sides of the frame and in the usual manner are provided with pedals 4, and of a chain sprocket 5, which replaceably carries three gear rings 6, around which a drive chain 7, indicated in phantom, is selectively trained. A difference from conventional pedal crank drives resides in that the chain sprocket 5 provided with the gear rings 6 is not non-rotatably connected to the pedal crank shaft 3 but by means of a rolling element bearing 8 is rotatably mounted on the pedal crank shaft 3 or on the hub 9 of the pedal crank. Force is transmitted between the pedal cranks 4a, 4b and the chain sprocket 5 by a force-transmitting spring 10, which extends on the outside of the chain sprocket 5 in the peripheral direction thereof and is clamped between an abutment 11 of that pedal crank 4a which is adjacent to the chain sprocket 5 and a support 12 of a U-shaped holder 13, which has been secured by fixing screws 14 to the outside of the chain sprocket 5. The pedal crank 4a which is adjacent to the chain sprocket is embraced by the holder 13 with an adequate clearance for permitting between that pedal crank 4a and the chain sprocket 3 a rotation, which corresponds to the spring excursion of the force-transmitting spring 10, which consists of a compression spring. A damping spring 15 is provided on that side of the pedal crank 4a which is opposite to the force-transmitting spring 10. That damping spring 15 is clamped between the abutment 11 and a support 16 provided on the other leg of the U-shaped holder 13 so that the position of rest of the pedal crank 4a is determined by the equilibrium of the torques exerted by the springs 10 and 15 on the pedal crank 4a. The initial stresses of the springs 10 and 15 can be changed by means of an adjusting screw 17, which carries a stop 18 for the damping spring 15.

As the pedal crank 4a is tread in the direction indicated by the arrow 19, the driving torque will be transmitted to the chain sprocket 5 by the force-transmitting spring 10, which in dependence on the forces exerted by the foot will be compressed whereas the damping spring 15 will be relaxed at the same time. This action will continue until the bottom dead center has been reached, at which the driving torque exerted via the pedal cranks 4a, 4b reaches a minimum but the force-transmitting spring 10 relaxes so that the stored spring force can be utilized to overcome the dead center.

To prevent a sudden relaxation of the force-transmitting spring 10, which would result in a shock on the pedal cranks 4a, 4b in the reverse sense, the relaxation of the force-transmitting spring 10 is damped by the damping spring 15 because the force-transmitting spring 10 can relax only against the increasing spring force of the damping spring 15. Owing to that damping it is possible to use force-transmitting springs 10 which are sufficiently strong for taking up the driving forces and this can be achieved without an adverse effect on the uniform rotary drive. The damping force need not necessarily be exerted by a spring but may alternatively be exerted by a damper.

To permit an increase of the initial stress of the damping spring 15 in dependence on the load-dependent spring excursion of the force-transmitting spring 10, the support 16 shown in FIG. 3 consists of an adjustable ratchet lever 20, which cooperates with a pawl 21, which has two detent recesses 22 for the ratchet lever 20. The ratchet lever 20 is mounted on a pivot 23 to be rotatable relative to the holder 13 and by means of a biasing spring 24, which acts in the same sense as the damping spring 15, can be adjusted in the sense of the forward rotation of the pedal crank drive if such a readjustment is permitted by the spring excursion of the force-transmitting spring 10. The biasing spring 24 is preferably dimensioned like the damping spring 15 and will exert a part of the damping forces to be exerted when the excursion of the force-transmitting spring 10 has caused the ratchet lever 20 to leave one detent recess 22 in the sense of the arrow 20 and the ratchet lever 20 has not snapped into the succeeding detent recess.

The pawl 21 is biased in the locking sense by a spring 25 and for unlocking the ratchet lever 20 comprises a cam face 26, which is engageable by an unlocking member 27, which can be pivotally moved into the orbit of the pawl 21 by a Bowden cable, which is not shown for the sake of clearness, so that the unlocking member 27 causes the pawl 21 to be swung out about its pivot 28 against the force of the spring 25 and to release the ratchet lever 20, which will be swung back by the force-transmitting spring 10 if the spring excursion of the force-transmitting spring is sufficiently small. When the pawl 21 has snapped in, the ratchet lever 20 is again caught in a detent recess 22 and can be angularly advanced relative to the pawl 21 when this is permitted by the current maximum excursion of the force-transmitting spring 10. The maximum spring excursion of the force-transmitting spring 10 may be limited by an additionally provided stop.

The unlocking member 27 need not be actuated by means of a Bowden cable if during a reverse treading of the pedal crank drive the unlocking member 27 is forced by a cam face 29 of the pawl 21 against a stop 30 and subsequently unlocks the pawl 21 against the force of the spring 25, as is indicated in FIG. 3. But in that case it must be tolerated that the cam face 26 of the pawl 21 will lift the unlocking member 27 for a short time during each forward revolution; for that purpose the unlocking member is provided with a follower roller 31.

It need not be emphasized that various designs may be adopted for the force-transmitting spring 10 because it is sufficient that the forces exerted by the pedal cranks are transmitted to the chain sprocket 5 by a spring element. For instance, the designated coil spring 10 might be replaced by a rubber-elastic body or a gas spring. Alternatively, that leg of the U-shaped holder 13 which constitutes the support 12 might consist of a deflectable spring, which is engaged by the pedal crank 4a directly or through the intermediary of a pressure-transmitting member. The use of such a deflectable spring will involve radial displacements to be performed between the pedal crank 4a and the spring and such displacements can be allowed if the deflectable spring engages the pedal crank with a roller.

I claim:

1. A pedal crank drive for a bicycle, comprising two pedal cranks which are non-rotatable interconnected by a pedal crank shaft, a chain sprocket, which has at least one gear ring and is mounted to be rotatable relative to the pedal crank shaft, and at least one force-transmitting spring, which is disposed between the chain sprocket and that pedal crank which is adjacent to the chain sprocket, and said spring is adapted to be biased by a forward rotation of the pedal cranks as well as a damping spring, which is prestressed in a sense to bias the force-transmitting spring, is provided between the chain sprocket and the adjacent pedal crank, characterized in that the initial stress of the damping spring is adjustable in dependence on the spring excursion of the force-transmitting spring.

2. A pedal crank drive according to claim 1, characterized in that the damping spring is supported by a ratchet lever, which is spring-loaded in the sense of the damping spring and which cooperates with a pawl, which defines at least one detent position for the ratchet lever.

3. A pedal crank drive according to claim 2, characterized in that the pawl constitutes a cam face, which is engageable by an unlocking member.

4. A pedal crank drive according to claim 3, characterized in that the unlocking member is pivotally movable into the orbit of the pawl.

5. A pedal crank drive according to claim 1, characterized in that the force-transmitting spring and the damping spring consist of compression springs and clamp the pedal crank between them and the means for supporting the force-transmitting spring and the clamping spring adjacent to those spring ends which are remote from the pedal crank are in that a damping spring, which is prestressed in a sense to bias the force-transmitting spring, is provided between the chain sprocket and the adjacent pedal crank.

* * * * *